United States Patent
Zheng et al.

(10) Patent No.: US 10,224,610 B2
(45) Date of Patent: Mar. 5, 2019

(54) MOBILE COMPUTING DEVICE ANTENNA

(71) Applicant: HEWLETT-PACKARD DEVELOPMENT COMPANY, L.P., Houston, TX (US)

(72) Inventors: Tianji Zheng, San Diego, CA (US); Minjia Xu, Santa Clara, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/501,225

(22) PCT Filed: Oct. 24, 2014

(86) PCT No.: PCT/US2014/062156
§ 371 (c)(1),
(2) Date: Feb. 2, 2017

(87) PCT Pub. No.: WO2016/064415
PCT Pub. Date: Apr. 28, 2016

(65) Prior Publication Data
US 2017/0229762 A1     Aug. 10, 2017

(51) Int. Cl.
*H01Q 1/48*   (2006.01)
*H01Q 1/24*   (2006.01)
*H01Q 9/42*   (2006.01)
*G01S 3/06*   (2006.01)
*G01S 3/08*   (2006.01)

(52) U.S. Cl.
CPC ............ *H01Q 1/243* (2013.01); *G01S 3/065* (2013.01); *G01S 3/085* (2013.01); *H01Q 9/42* (2013.01); *H01Q 1/48* (2013.01)

(58) Field of Classification Search
CPC .................................. H01Q 9/42; H01Q 1/24
USPC ......................................................... 343/845
See application file for complete search history.

(56) References Cited

U.S. PATENT DOCUMENTS

| | | | |
|---|---|---|---|
| 7,230,571 B2 | 6/2007 | Gaucher et al. | |
| 7,403,160 B2 * | 7/2008 | Chiang | H01Q 9/36 343/702 |
| 9,196,948 B2 * | 11/2015 | Yamamoto | H01Q 1/002 |
| 9,356,336 B1 * | 5/2016 | Zheng | H01Q 5/378 |
| 2004/0017329 A1 | 1/2004 | Fang et al. | |
| 2004/0061652 A1 * | 4/2004 | Ishihara | H01Q 9/0421 343/752 |
| 2008/0258992 A1 * | 10/2008 | Tsai | H01Q 1/2266 343/853 |
| 2009/0231213 A1 * | 9/2009 | Ishimiya | H01Q 1/243 343/702 |
| 2010/0156745 A1 * | 6/2010 | Andrenko | H01Q 1/38 343/848 |

(Continued)

*Primary Examiner* — Huedung X Mancuso
(74) *Attorney, Agent, or Firm* — Brooks, Cameron & Huebsch, PLLC

(57) ABSTRACT

A mobile computing device antenna according to one example includes a folded monopole element, a ground plane coupled to the folded monopole element by an antenna feed, a parasitic element that couples the folded monopole element to the ground plane, and a metal frame that encompasses the folded monopole element, the ground plane, and the parasitic element, where the metal frame is coupled to the ground plane by a plurality of ground points.

15 Claims, 3 Drawing Sheets

(56) References Cited

U.S. PATENT DOCUMENTS

| | | | |
|---|---|---|---|
| 2011/0074638 A1* | 3/2011 | Gong | H01Q 1/243 |
| | | | 343/702 |
| 2012/0019418 A1 | 1/2012 | Wong et al. | |
| 2012/0169547 A1 | 7/2012 | Oh et al. | |
| 2012/0249393 A1* | 10/2012 | Hotta | H01Q 1/243 |
| | | | 343/843 |
| 2012/0313834 A1 | 12/2012 | Eom et al. | |
| 2013/0050057 A1 | 2/2013 | Hayashi et al. | |
| 2013/0285870 A1 | 10/2013 | Hotta et al. | |
| 2013/0335278 A1 | 12/2013 | Lin et al. | |
| 2014/0078010 A1 | 3/2014 | Li et al. | |
| 2014/0139379 A1 | 5/2014 | Bolin et al. | |

* cited by examiner

MOBILE COMPUTING DEVICE ANTENNA

BACKGROUND

A mobile computing device, such as a tablet for instance, may provide voice and data communications functionality, as well as computing and processing capabilities. Such mobile computing devices may operate wirelessly. Such mobile computing devices may be utilized for wireless operation.

DETAILED DESCRIPTION

Examples of the present disclosure provide mobile computing device antennas and provide mobile computing devices including antennas. Examples of mobile computing devices include tablets, media players, and cellular telephones such as smart phones, among others. For some mobile computing devices it may be advantageous to provide structural integrity, while providing desirable performance in reception and/or transmission of a signal. Reception and/or transmission of a signal can be affected by the design and implementation of a mobile computing device's antenna. The signal can be received and/or transmitted by utilizing radio communication frequency. Different radio communication frequencies may be utilized in different geographic regions.

Because of the different radio communication frequencies, previous mobile computing devices have utilized non-continuous frames, i.e. a metal frame that is cut into segments and/or is slotted, so that each resulting segment is utilized as an antenna for particular frequency. However by utilizing segmentation, these previous mobile computing devices have reduced structural integrity.

Examples of the present disclosure provide that mobile computing device antennas and provide mobile computing devices including antennas that provide desirable performance in reception and/or transmission of a signal over a variety of radio communication frequencies. Examples of the present disclosure can provide desirable performance in reception and/or transmission for radio communication frequencies utilized in different geographic regions. For instance, examples of the present disclosure can provide desirable performance in reception and/or transmission for bands utilized in North America, i.e, bands from 698 megahertz to 960 megahertz, bands utilized in Europe, the Middle East and Africa (EMEA) i.e, bands from 791 megahertz to 960 megahertz, and wireless wide area network (WWAN) high bands from 1710 megahertz to 2170 megahertz, and/or 2500 megahertz to 2690 megahertz. Additionally, the examples of the present disclosure can provide improved structural integrity, as compared to previous mobile computing devices having frames that are segmented and/or cosmetic, by utilizing a continuous metal frame.

Figure 1:
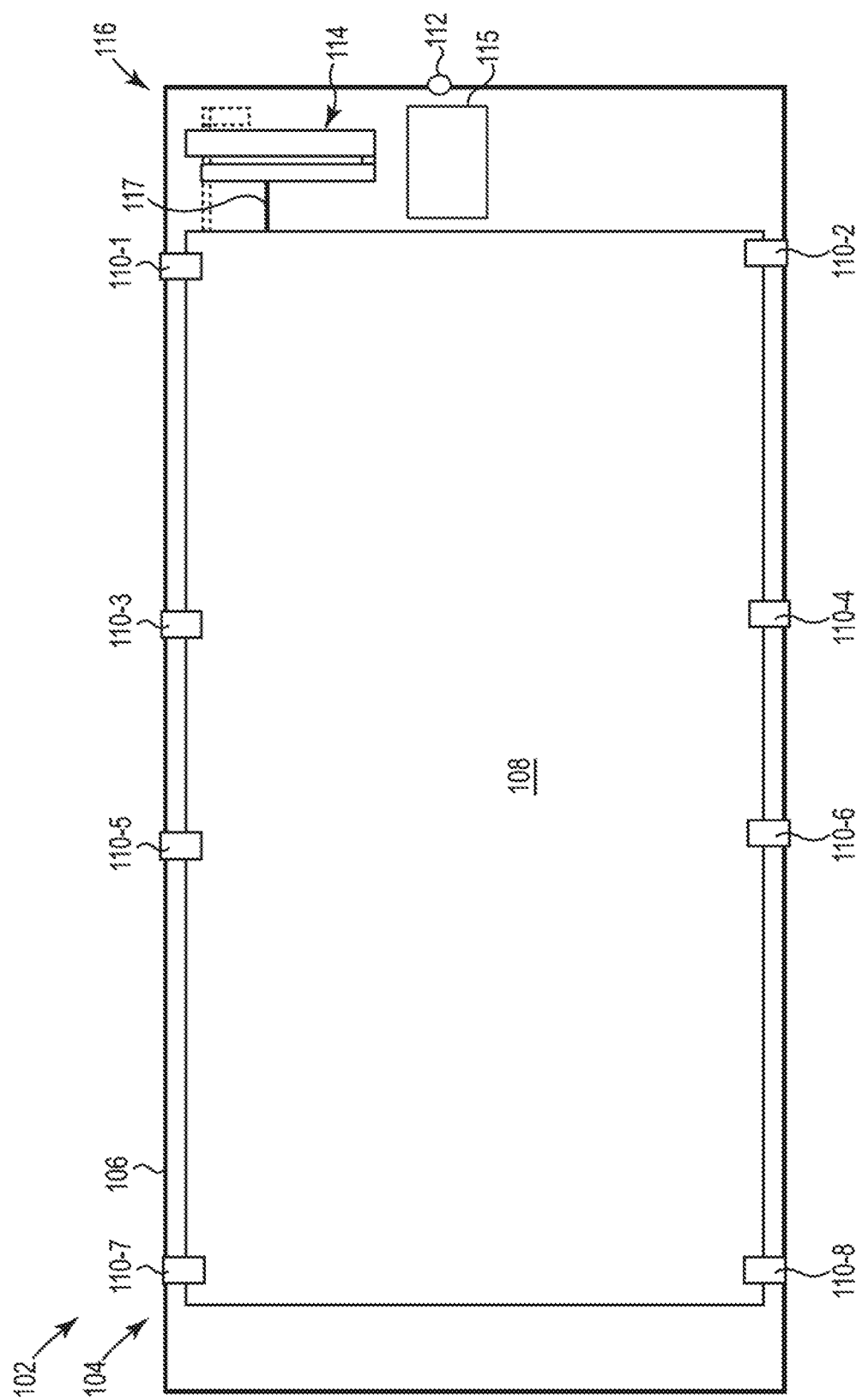
FIG. 1 illustrates a portion of an example of a mobile computing device according to the present disclosure.

FIG. 1 illustrates a portion of an example of a mobile computing device 102 according to the present disclosure. The mobile computing device 102 can include a mobile computing device antenna 104.

The mobile computing device antenna 104 can include a metal frame 106. The metal frame 106 can include different metals for various applications. The metal frame 106 can be conductive.

Examples of the present disclosure provide that the metal frame 106 can be a continuous metal frame. As illustrated in FIG. 1, the metal frame 106 can form a closed loop. In other words, the metal frame 106 is not cut into segments and/or is not slotted. Because the metal frame 106 is continuous, the metal frame 106 can help provide structural integrity while have a reduced thickness, as compared to frames of other mobile computing devices that utilize non-continuous metal frames such as those that are segmented and/or slotted. As used herein, structural integrity is refers to resisting breakage or bending. Because the metal frame 106 can have a reduced thickness, the metal frame 106 and thus the mobile computing device 102 may have a reduced weight, as compared to previous mobile computing devices that are segmented and/or slotted metal frames.

The mobile computing device 102 can include a ground plane 108. Some examples of the present disclosure provide that the ground plane 108 includes a metal chassis. Some examples of the present disclosure provide that the ground plane 108 includes a printed circuit board. While FIG. 1 illustrates a single ground plane 108, examples of the present disclosure are not so limited. For instance, the mobile computing device 102 may include both a metal chassis and a printed circuit board such that one or both is utilized as a ground plane(s).

Examples of the present disclosure provide that the metal frame 106 can be coupled to the ground plane 108. For instance, the metal frame 106 can be coupled to the ground plane 108 by a plurality of ground points 110-1, 110-2, 110-3, 110-4, 110-5, 110-6, 110-7, 110-8. Examples of the present disclosure provide that the plurality of ground points 110-1, 110-2, 110-3, 110-4, 110-5, 110-6, 110-7, 110-8 can directly connect the metal frame 106 and the ground plane 108. While FIG. 1 illustrates eight ground points, examples of the present disclosure are not so limited. Different numbers of ground points may be utilized to couple the metal frame 106 to the ground plane 108 for various applications. For instance, some examples of the present disclosure provide that only two ground points, such as ground point 110-1, 110-2, couple the metal frame 106 to the ground plane 108.

Examples of the present disclosure provide that the metal frame 106 can include a number of conductive nodes, such as conductive node 112. Different numbers of, conductive nodes may be utilized for various applications. Some examples of the present disclosure provide that the conductive nodes, e.g., conductive node 112, do not directly connect the metal frame 106 and the ground plane 108. For instance, as illustrated in FIG. 1, grounding points 110-1 and 110-2 each intervene between conductive node 112 and the ground plane 108 with respect to the metal frame 106. The conductive nodes, such as conductive node 112, can include a metal. An example of the metal is copper, among others. Some examples of the present disclosure provide the conductive node 112, the ground point 110-1, and the ground point 110-2 can form a loop that may be utilized for a particular resonance. The particular response can be tuned by varying a location of the conductive node 112, the ground point 110-1, and/or the ground point 110-2.

The mobile computing device 102 can include a folded monopole element 114, as discussed further herein. The mobile computing device 102 can include a parasitic element 116, as discussed further herein, that couples the folded monopole element 114 to the ground plane 108. The mobile computing device 102 can include an antenna feed 117, as discussed further herein.

The mobile computing device 102 can include a number of elements that may be utilized for a variety of functions. For instance, in some examples, the mobile computing device 102 can include a camera 115, among other elements.

As illustrated in FIG. 1, the metal frame 106 can encompass elements of the mobile computing device 102. For instance, the metal frame 106 can encompass the folded monopole element 114, the ground plane 108, and the parasitic element 116, among others.

Figure 2:
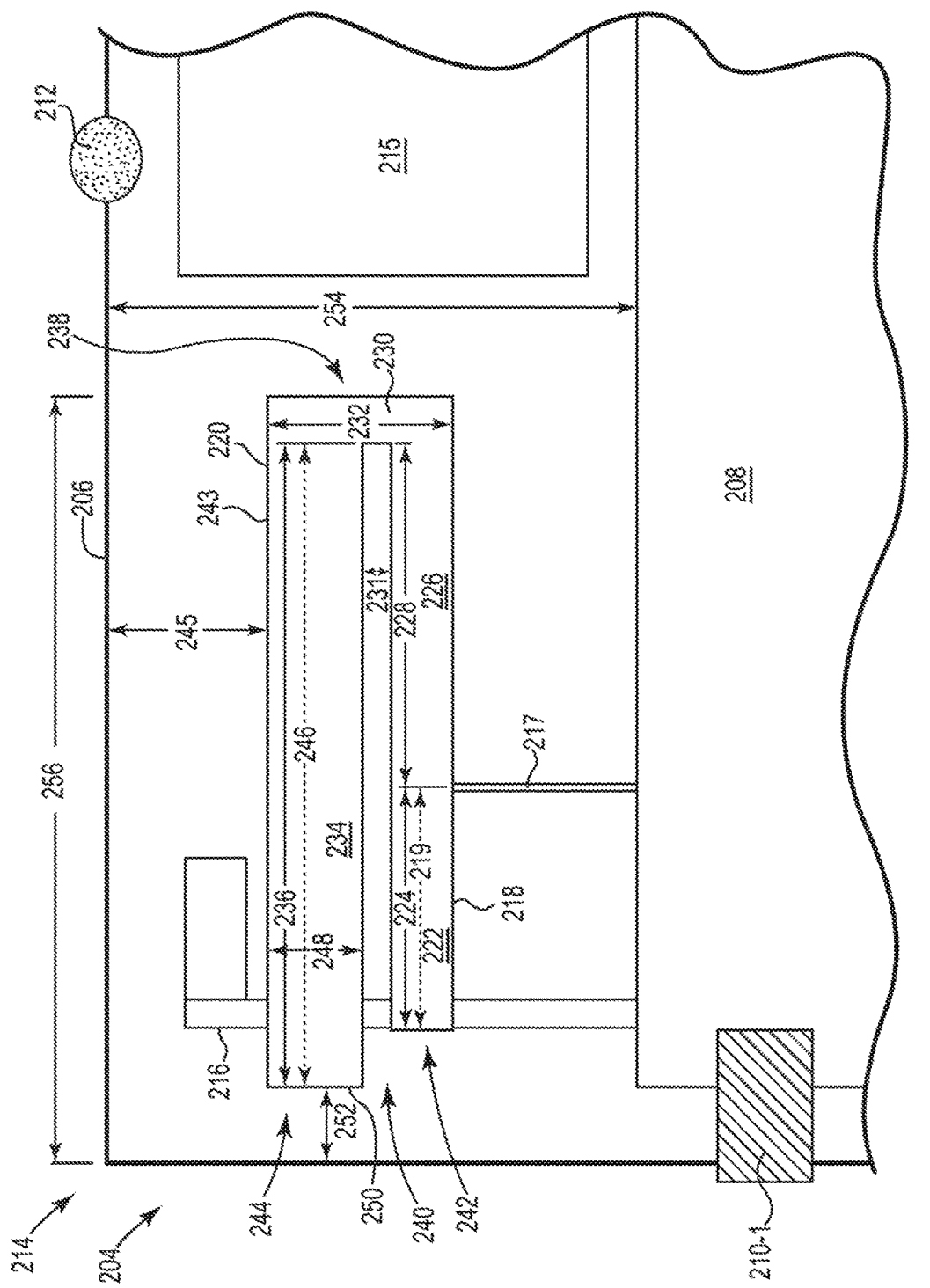
FIG. 2 illustrates a portion of an example of a mobile computing device antenna according to the present disclosure.

FIG. 2 illustrates a portion of an example of a mobile computing device antenna according to the present disclosure. The mobile computing device antenna 204 can include a folded monopole element 214.

The folded monopole element 214 can include a number of antenna arms. For instance, the folded monopole element 214 can include a first antenna arm 218 and a second antenna arm 220.

Examples of the present disclosure provide that the first antenna arm 218 can be a short arm, as compared the second antenna arm 220. The first antenna arm 218 can include a portion 222 having a length 224. Some examples of the present disclosure provide that the length 224, i.e. a length of the first arm 218, can be from 3.0 millimeters to 9.0 millimeters. Some examples of the present disclosure provide that the length 224 can be from 4.5 millimeters to 7.5 millimeters. As illustrated in FIG. 2, the first antenna arm 218 can have a longitudinal axis 219.

Examples of the present disclosure provide that the second antenna arm 220 can be a long arm, as compared the first antenna arm 218. The second antenna arm 220 can include a first portion 226 having a length 228, second portion 230 having a length 232, and third portion 234 having a length 236. Some examples of the present disclosure provide that the length 228 can be from 16.0 millimeters to 26.0 millimeters or from 18.0 millimeters to 24.0 millimeters; the length 232 can be from 7.0 millimeters to 13.0 millimeters or from 8.5 millimeters to 11.5 millimeters; and the length 236 can be from 38.0 millimeters to 52.0 millimeters or from 41.0 millimeters to 49.0 millimeters. As such, the antenna second arm 220 can have a length that is a sum of the length 228, the length 232, and the length 236. Examples of the present disclosure provide that the length of the first antenna arm 218, e.g., the length 244, is less than the length of the second antenna arm 220, e.g., the sum of the length 228, the length 232, and the length 236.

As illustrated in FIG. 2, a portion 222 of the first antenna arm 218 can be separated from a portion 234 of the second antenna arm 220 by a distance 231. Examples of the present disclosure provide that the distance 231 can be from 1.0 millimeter to 4.0 millimeters or from 1.5 millimeters to 3.5 millimeters. Also as illustrated in FIG. 2, examples of the present disclosure provide that a portion of the first antenna arm 218 can be located between a portion of the second antenna arm 220 and a portion of the ground plane 208.

The folded monopole element 214 can include a closed end 238 and an open end 240. Examples of the present disclosure provide that the closed end 238 can include the second portion 230. Examples of the present disclosure provide that the open end 240 can include a line that bisects a distal end 242 of the portion 222 and a distal end 244 of the portion 234.

Examples of the present disclosure provide that the folded monopole element 214 can have different orientations for various applications. As illustrated in FIG. 2, the closed end 238 may be located nearer to the conductive node 212 and/or the camera 215, as compared to the open end 240, while the open end 240 is located nearer to the ground point 210-1, as compared to the closed end 238. However, examples of the present disclosure are not so limited. Some examples provide that the closed end 238 may be located nearer to the to the ground point 210-1, as compared to the open end 240, while the open end 240 is located nearer to the conductive node 212 and/or the camera 215, as compared to the closed end 238. For other applications, a different orientation of the folded monopole element 214 may be utilized.

Examples of the present disclosure provide that a longitudinal portion 243 of the folded monopole element 214 can be separated from the metal frame 206 by a distance 245. As illustrated in FIG. 2, the portion 243, which is parallel to a longitudinal axis 246 of the third portion 234, is the distance 245 from the metal frame 206. The distance 245 is parallel to a transverse axis 248 of the third portion 234, where the transverse axis 248 is perpendicular to the longitudinal axis 246. Some examples of the present disclosure provide that distance 245 can be from 1.0 millimeter to 5.0 millimeters or from 2.0 millimeters to 4.0 millimeters. Some examples of the present disclosure provide that the longitudinal axis 219 is parallel to the longitudinal axis 246.

Separating the folded monopole element 214 from the metal frame 206 by the distance 245 can couple the folded monopole element 214 and metal frame 206 to provide a particular resonance. Examples of the present disclosure provide that the particular resonance can be tuned by varying the by the distance 245.

Examples of the present disclosure provide that a portion 250 of the folded monopole element 214, e.g., a portion 250 located at the distal end 244, can be a distance 252 from the metal frame 206. As illustrated in FIG. 2, the portion 250, which is parallel to the transverse axis 248 of the third portion 234, is the distance 252 from the metal frame 206. The distance 252 is parallel to the longitudinal axis 246 of the third portion 234. Some examples of the present disclosure provide that distance 252 can be from 6.0 millimeters to 12.0 millimeters or from 7.5 millimeters to 10.5 millimeters. As illustrated in FIG. 2, some examples of the present disclosure can provide that the distal end 244 is nearer to the metal frame 206, as compared to the distal end 242.

The mobile computing device antenna 204 can include a parasitic element 216. The parasitic element 216 can couple the first antenna arm 218 and the second antenna arm 220 to the ground plane 208. Examples of the present disclosure provide that the parasitic element 216 can be conductive. For instance, the parasitic element can include a metal, such as copper among others. Some examples of the present disclosure provide that the parasitic element 216 is a grounded element. For instance, some examples of the present disclosure provide that the parasitic element 216 is not electrically, e.g., directly, connected to the folded monopole element 214. Some examples of the present disclosure provide that the parasitic element 216 is electrically, e.g., directly, connected to the ground plane 208. The parasitic element 216 can be utilized as a passive resonator.

As illustrated in FIG. 2, the parasitic element 216 can be located proximate to the open end 240 of the folded monopole element 214. However, examples of the present disclosure are not so limited. The parasitic element 216 can have different locations for various applications. For instance, some examples provide that the parasitic element 216 can be located proximate to the closed end 238 of the folded monopole element 214, rather than the open end 240. Additionally, some examples provide that the parasitic element 216 can have a transverse location on the mobile computing device, relative to a location of the folded monopole element 214. Further, examples of the present disclosure provide that the parasitic element 216 can be located on an opposite side of the mobile computing device, relative to a location of the folded monopole element 214. For instance, some examples provide that the folded monopole element 214 can be located on a first surface of the mobile computing device, while the parasitic element 216 is located on a second surface of the mobile computing device, where the first surface is opposite of the second surface.

The mobile computing device antenna 204 can include an antenna feed 217. The antenna feed 217 can couple the first antenna arm 218 and the second antenna arm 220 to the ground plane 208. The antenna feed 217 can be a coaxial cable connection, a microstrip line, a coplanar waveguide, or a parallel transmission line, for example. As illustrated in FIG. 2, the antenna feed 217 can physically connect the ground plane 208 and the folded monopole element 214.

Elements of the mobile computing device antenna 204, e.g., the folded monopole element 214, the parasitic element 216, and the antenna feed 217, can be located in an area having a reduced size, as compared to previous antennas. Examples of the present disclosure provide the area can be defined by a first distance 254 and a second distance 256.

As illustrated in FIG. 2, the first distance 254 can be a distance from the metal frame 206 to the ground plane 208. The first distance 254 can be parallel to the transverse axis 248 of the third portion 234. Examples of the present disclosure provide the first distance 254 can be from 10.0 millimeters to 20.0 millimeters or from 12.0 millimeters to 18.0 millimeters.

As illustrated in FIG. 2, the second distance 256 can be a distance from the metal frame 206 that encompasses the folded monopole element 214. The second distance 256 can be parallel to the longitudinal axis 246 of the third portion 234. Examples of the present disclosure provide the second distance 256 can be from 45.0 millimeters to 75.0 millimeters or from 50.0 millimeters to 70.0 millimeters.

Figure 3:
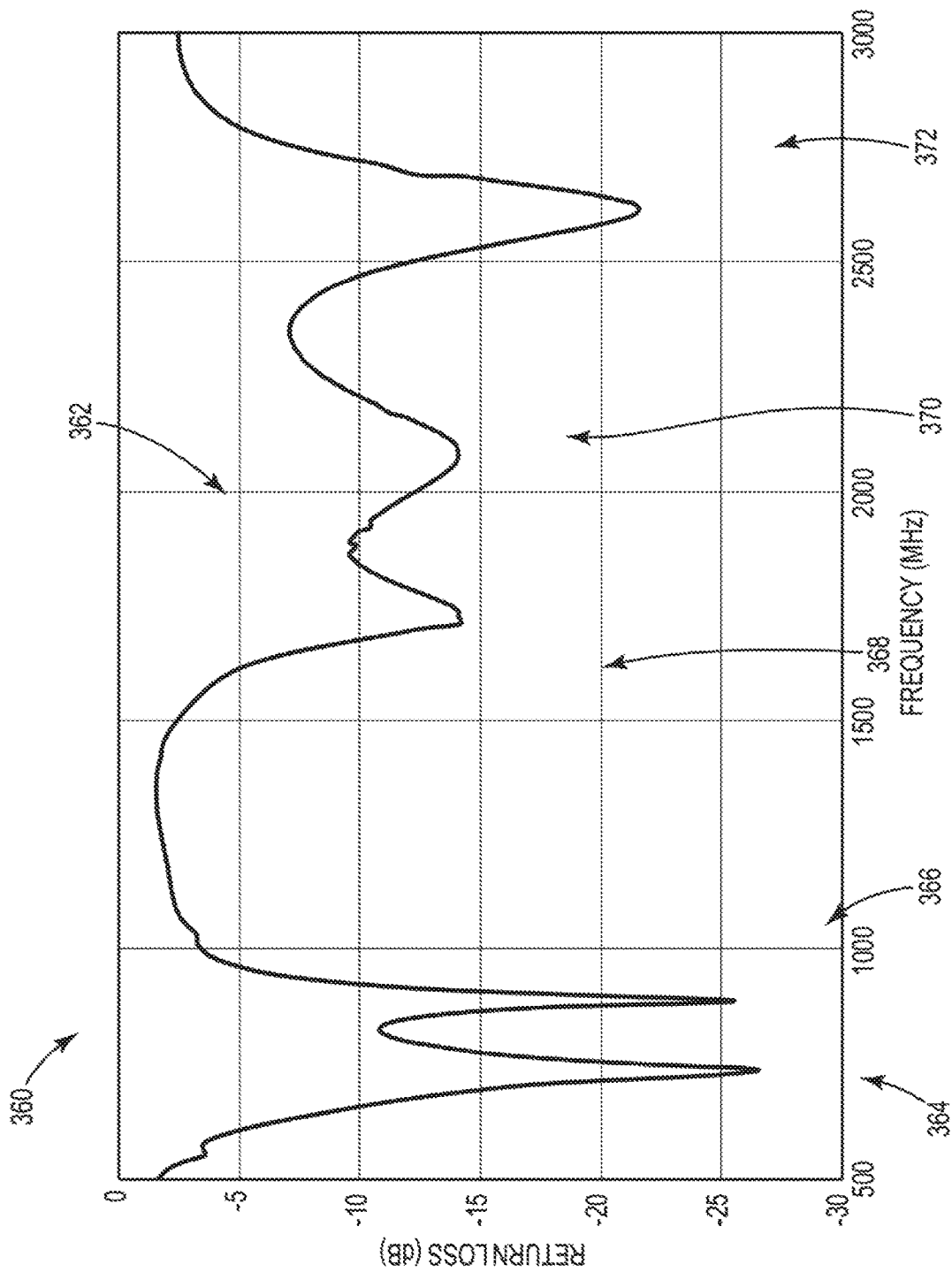
FIG. 3 illustrates a resonance diagram associated with an example of a mobile computing device antenna according to the present disclosure.

FIG. 3 illustrates a resonance diagram 360 associated with an example of a mobile computing device antenna according to the present disclosure. The resonance diagram 360 includes curve 362 plotted with a y-axis indicating return loss in decibels and an x-axis indicating megahertz.

A first resonance 364 occurs from 690 to 790 megahertz. The first resonance 364 can be attributed to a coupling of the folded monopole element to the metal frame, as discussed herein. Some examples of the present disclosure provide that first resonance 364 can be tuned by varying a location of ground point 110-1 and/or ground point 110-2, as discussed with FIG. 1.

A second resonance 366 occurs from 840 to 940 megahertz. The second resonance 366 can be attributed to the long arm of the folded monopole element, as discussed herein.

A third resonance 368 occurs from 1700 to 1880 megahertz. The third resonance 368 can be attributed to a high mode of the folded monopole element to the metal frame, as discussed herein.

A fourth resonance 370 occurs from 1920 to 2170 megahertz. The fourth resonance 370 can be attributed to the parasitic element, as discussed herein. Some examples of the present disclosure provide that the fourth resonance 370 can also be achieved with the short arm of the folded monopole element, e.g. by utilizing a particular length for the short arm.

A fifth resonance 372 occurs from 2500 to 2700 megahertz. The fifth resonance 372 can be attributed to the short arm of the folded monopole element, as discussed herein. Some examples of the present disclosure provide that the fifth resonance 372 can also be achieved with the parasitic element, e.g. by utilizing a particular length for the parasitic element.

As such, examples of the present disclosure can provide desirable performance in reception and/or transmission for in a number of geographic regions, such as North America and EMEA, that may utilize bands from 698 megahertz to 960 megahertz, from 791 megahertz to 960 megahertz, 1710 megahertz to 2170 megahertz, and/or 2500 megahertz to 2690 megahertz.

The specification examples provide a description of the piezoelectric printhead assemblies and, method of the present disclosure. Since many examples can be made without departing from the spirit and scope of the system and method of the present disclosure, this specification sets forth some of the many possible example configurations and implementations.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

The figures herein follow a numbering convention in which the first digit or digits correspond to the drawing figure number and the remaining digits identify an element or component in the drawing. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, "a number of" an entity, an element, and/or feature can refer to one or more of such entities, elements, and/or features.

What is claimed:

1. A mobile computing device antenna comprising:
   a folded monopole element positioned on a first surface of the mobile computing device;
   a ground plane coupled to the folded monopole element by an antenna feed;
   a parasitic element that is directly connected to the ground plane and positioned on a second surface of the mobile computing device, the folded monopole element to couple the folded monopole element to the ground plane, wherein the first surface and the second surface are opposite each other and the folded monopole element overlays the parasitic element; and
   a metal frame that encompasses the folded monopole element, the ground plane, and the parasitic element, wherein the metal frame is coupled to the ground plane by a plurality of ground points.

2. The mobile computing device antenna of claim 1, wherein the metal frame forms a closed loop.

3. The mobile computing device antenna of claim 1, wherein the folded monopole element includes a first antenna arm having a first length and a second antenna arm having a second length.

4. The mobile computing device antenna of claim 3, wherein the first length is less than the second length.

5. The mobile computing device antenna of claim 3, wherein a portion of the first antenna arm is located between a portion of the second antenna arm and a portion of the ground plane.

6. The mobile computing device antenna of claim 3, wherein the first antenna arm and the second antenna arm are coupled to the ground plane by the antenna feed.

7. A mobile computing device antenna comprising:
   a folded monopole element positioned on a first surface of the mobile computing device, the folded monopole element including:
      a first antenna arm having a first longitudinal axis; and
      a second antenna arm extending from the first antenna arm and having a second longitudinal axis that is parallel to the first longitudinal axis;
   a ground plane coupled to the first antenna arm and the second antenna arm by an antenna feed;
   a parasitic element directly connected to the ground plane and positioned on a second surface of the mobile computing device, the parasitic element to couple the first antenna arm and the second antenna arm of the folded monopole element to the ground plane, wherein the first surface and the second surface are opposite each other and the folded monopole element overlays the parasitic element; and
   a metal frame that encompasses the first antenna arm, the second antenna arm, the ground plane, and the parasitic element, wherein the metal frame is coupled to the ground plane by a plurality of ground points.

8. The mobile computing device antenna of claim 7, wherein the metal frame is continuous.

9. The mobile computing device antenna of claim 7, wherein the first antenna arm, the second antenna arm, and the parasitic element are located in an area defined by a first distance that is from 10.0 millimeters to 20.0 millimeters and a second distance that is from 45.0 millimeters to 75.0 millimeters.

10. The mobile computing device antenna of claim 7, wherein the first antenna arm and the second antenna arm are separated by a distance that is from 1.0 millimeter to 4.0 millimeters.

11. The mobile computing device antenna of claim 7, wherein a longitudinal portion of the second antenna arm is separated from the metal frame by a distance from 1.0 millimeter to 5.0 millimeters.

12. The mobile computing device antenna of claim 7, wherein an end portion of the second antenna arm is separated from the metal frame by a distance from 6.0 millimeters to 12.0 millimeters.

13. A mobile computing device comprising:
   a folded monopole element positioned on a first surface of the mobile computing device, the folded monopole element including:
      a first antenna arm having a first longitudinal axis; and
      a second antenna arm extending from the first antenna arm and having a second longitudinal axis that is parallel to the first longitudinal axis;
   a ground plane coupled to the first antenna arm and the second antenna arm by an antenna feed;
   a parasitic element directly connected to the ground plane and positioned on a second surface of the mobile computing device, the parasitic element to couple the first antenna arm and the second antenna arm of the folded monopole element to the ground plane, wherein the first surface and the second surface are opposite each other and the folded monopole element overlays the parasitic element; and
   a continuous metal frame that encompasses the first antenna arm, the second antenna arm, the ground plane, and the parasitic element, wherein the continuous metal frame is coupled to the ground plane by a plurality of ground points.

14. The mobile computing device claim 13, wherein the ground plane comprises a metal chassis.

15. The mobile computing device claim 13, wherein the ground plane comprises a printed circuit board.

* * * * *

UNITED STATES PATENT AND TRADEMARK OFFICE
CERTIFICATE OF CORRECTION

PATENT NO. : 10,224,610 B2
APPLICATION NO. : 15/501225
DATED : March 5, 2019
INVENTOR(S) : Tianji Zheng et al.

Page 1 of 1

It is certified that error appears in the above-identified patent and that said Letters Patent is hereby corrected as shown below:

In the Claims

In Column 8, Line 38 (Approx.), Claim 14, after "device" insert -- of --.

In Column 8, Line 40 (Approx.), Claim 15, after "device" insert -- of --.

Signed and Sealed this
Second Day of July, 2019

Andrei Iancu
*Director of the United States Patent and Trademark Office*